United States Patent [19]

Overbeck

[11] Patent Number: 4,807,169

[45] Date of Patent: Feb. 21, 1989

[54] INFORMATION DEVICE CONCERNING FOOD PREPARATION

[76] Inventor: Felix J. Overbeck, Am Heidberg 13, D-4100 Duisburg 25, Fed. Rep. of Germany

[21] Appl. No.: 846,703

[22] Filed: Mar. 31, 1986

[51] Int. Cl.⁴ .............................................. G06F 9/00
[52] U.S. Cl. ........................... 364/715.01; 364/413.29
[58] Field of Search ................ 364/200, 900, 715, 400

[56] References Cited

U.S. PATENT DOCUMENTS 4,437,159  3/1984  Waugh ................................. 364/144
4,575,804  3/1986  Ratcliff ................................ 364/715

*Primary Examiner*—Gareth D. Shaw
*Assistant Examiner*—John G. Mills
*Attorney, Agent, or Firm*—Ralf H. Siegemund

[57] ABSTRACT

The present invention provides a new and improved method for combining, selecting and preparing food dishes by means of a data storage device or diet calculator. The particular components and ingredients of a meal are stored separately and the data pertaining to a particular meal and/or dish including instructions for preparation can be called up in sequence or can be output through appropriate input commands. The data concerning the menu or recipes of food preparation may be displayed on a display device when retrieved from memory or when entered into memory from the keyboard.

2 Claims, 2 Drawing Sheets

INFORMATION DEVICE CONCERNING FOOD PREPARATION

BACKGROUND OF THE INVENTION

The present invention relates to the information transmission in restaurants, private households or the like and it relates particularly to food preparation.

Information transmission of the type to which the invention pertains generally is comprised of written documents on the basis of which kitchens of any size, including large scale ones as well as private households, combine particular food and dishes to obtain meals. In the private domain many people work in their kitchen on the basis of long established customs. A good housewife is generally in a position to compose or prepare a "program" of meals covering roughly 10 to 15 different main dishes for the people to be served. Individuals taking care of themselves usually limit their menu to about four or six different dishes. Generally the desire or even requirement exists to look for new approaches of meal preparation, but these attempts usually do not materialize for reasons of complacency or for lack of the requisite equipment or means.

Therefore the so called state of the art in this instance is presented by illustrated cook books from which one can take dishes including the recipes and methods of approach for making these dishes and preparing meals accordingly. Such books are used primarily in private households but also in restaurants. Aside from other disadvantages the utilization of such cook books often lacks certain hygienic aspects and is neither economical nor technically advantageous. The reason is that standardized meals contained in cook books often do not match the eating habits of the user. Consequently private notations (handwritten notes) or the like are often used to modify the content of these cook books. On the other hand the cook books themselves lack space and facilities for such an expansion.

Another aspect is that quite obviously it is almost impossible to provide a cook book that includes all menu combinations as they are customary in all countries, e.g. for purposes of accommodating special wishes of a guest. The international situation considered against a backfront of large scale, complex economic and personal relations among the people of the world have developed extensively in past decades. One can say here that as a rule a foreign guest may not necessarily be satisfied by a metal taken from a "local" cook book. Concerning the desired flexibility of cook books realization of consent may in fact be impractical or impossible as far as the facilities for food preparation are concerned (until a few years ago nobody knew what a "wok" was). With increasing amounts of food to be prepared existing personnel cannot be expected to consult one or numerous cook books all the time and specifically in between the various (unused) steps that lead to preparation of one or various dishes. Thus, it can be said that the customary well known cook book as it is known today is no longer practical and is based on wrong suppositions and assumptions as far as its use is concerned. It is no longer hygienic in application and its extent is usually too limited. Also, its capability of expanding its case is limited. Obviously loose leaf card files which one may readily update are for many points of view quite impractical to use.

Another aspect is for example the feeding of sick people with special diets prescribed for example after consultation with a physician. Related thereto is the nutrition of people generally but with the eye on special health problems and special diets. In this regard the customary cook books are totally unsuitable. Generally it can be said that cook books in the field of health are practically non-existent; or, whereever certain diet cook books are offered, their selection and variety as far as different dishes and meals is concerned is extremely limited and permits no accomodation to the special food combinations and needs as prescribed for example by a doctor to an individual.

DESCRIPTION OF THE INVENTION

It is an object of the present invention to provide a new and improved method and equipment for the combining, selection, supplementing, preparation of food which can be used generally in food preparation (meals, dishes etc.) in private homes as well as on a large scale and which are economical as well as very hygienic, and easy to use particularly as far as tiem is concerned.

In accordance with the preferred embodiment of the present invention it is suggested to provide data storage facilities and to store them in a meal/dish program fashion, a number of data representing meals, dishes, preparation and, possibly, use data whereby the particular components and ingredients are separately stored, and the data pertaining to a particular meal and/or dish including instructions for preparation can be called upon and called up in sequence, and that on the other hand relevant data can be keyed in through appropriate input commands or extracted from the storage facility for being appropriately displayed.

Such a device and arrangement can be used independently from volume restrictions of a cook book. Therefore any initial compilation can be expanded to the extent the system of data storage permits the adding of storage facilities which in case of the hard disk is very extensive but floppy disks on cassettes may amply suffice. Obviously such a system meets hygienic demands better than regular cook books and permits random generation of menus (meals and dishes) as well as random selection and permits, further, to modify numerous dishes corresponding to different tastes as they are ethnically based. Moreover the invention avoids extensive reading processes during food preparation.

Such a device and arrangement can be used from two different points of view. One, it can be used as a regular kind of encyclopedia type cook book or as a device for suggesting various combinations under the consideration of the fact that additional combinations can always be added corresponding to new dishes as they appear and new combinations of dishes and meals. Health aspects are considered by the invention in that the call up program for particular meals/dishes and ingredients can be organized on the basis of calory content, vitamin content and other aspects such as cholesterol etc. Also, vegetable dishes for vegetarians can easily be selected simply through the exclusion of certain "undesirable" ingredients in the cell up procedure. In order to obtain the requisite preconditions for the food preparation as needed in cooking it is of advantage if the device includes, as far as data storage is concerned, information on specific cooking implements. Aside from the stove the implements needed for particular dish can be stored in terms of pots, pot sizes, containers, ladels, skillets, spoons, forks of specialized nature etc.

In order to meet local conditions as well as certain minimum requirements practical considerations may involve protection against moisture, dirt and heat. This involves the electric circuit which should be composed of modules including an input and output module, a microprocessor operated by a clock, a regular working memory and a memory for meal/dish/ingredient preparation-programs as well as an information and data bus that interconnects these components. The microprocessor is used primarily for computation, timing and counting operations as well as comparing tasks, in order to obtain the desired indication of ingredients for meals as well as the requisite recipe information and to control the display. The working storage unit serves for purposes of loading the respective selected meal/dish etc. program which has to be executed. The program storage facility will, in accordance with its capacity, store a number of menus (in the sense of food i.e. combination of dishes) as well as practical information concerning the making and preparation of the meals and dishes included in the menu.

Of particular advantage is of course the fact that information is protected against soiling through food residue. Also, the inventive device is quite small and it is suggested specifically to arrange all electronic components on a small circuit board. Operating the invention under consideration of hygienic food preparation and as they are usually found in the kitchen will be facilitated by providing a keyboard on the outside of the casing that includes the device. The keyboard is operatively connected to the input and output unit or module. The readout of the ssequential preparation steps of individual dishes and meals is facilitated by providing outside of the casing and in operative connection to the input and output module, a menu or dish jump or skip selection key or keys. For controlling the equipment i.e. for obtaining for example the periods of time necessary for preparation of individual meals it is suggested that the clock be equipped with or provided as a stop watch and/or any other clock likewise connected to the input and output module. A start/stop key may be provided and there may be a variety of optical and/or acoustical signals produced having relation to the sequence of the food preparation. In case certain steps in the preparation of certain dishes have to be strictly observed certain steps may have to be taken before the next operating step is initiated. For this it is of advantage if a completion indicating key is provided as operative conection to the input and output module by means of which individual steps can be stopped or deferred.

The equipment can be readily be accomodated for matching different tastes, and different eating habits in different countries. The program storage facility may be exchangeable. Herein a worldwide use is considered. Each of these "ethnic" or "local" meal programs for example is presented in the form of EPROM which may contain particular customary or usual menu selection as they are customary in particular regions. Depending upon the capability of the device as a whole it is of advantage to configur the keyboard as alphanumerical keyboard but a simple number key may suffice in cheaper models, or both may be provided. The display may use liquid crystal technology. The keyboard may be of the touch type protected by a foil in order to establish hygienic protection of the equipment.

Thus far the basic system has been described but it is readily available for expansion. Instead of a single liquid crystal display a TV-type monitor can be used and possibly a color TV may display multicolor dishes. Such a monitor may even be provided in the dining room so that the people for whom the meals are prepared can on that basis select some dishes. For examples guests or the like in restaurants may look at the desired food and order on that basis including the possibility of composing specific meals to be ordered. It may also be of importance to compose meals on the basis of cost, price or the like. This way one may need a BTX connection for variably inputing the relevant prices for ingredients, food preparation, cost etc.

In order to facilitate the procurement of the ingredients necessary for the various meals and foods it may be of advantage to include a printer with specific print programs being contained in the system. The user is then enabled to compose in a very short time order lists or one or more meals as well as the ingredients, in order to procure whatever he or she needs. Thus it will take the place of the usual illegible shopping list.

Modifications in addition to expansion of the entire storage capability is obtained by including a floppy disk system or a cassette recorder since time in terms of computer time is not deemed that critical.

In order to maintain certain safety requirements as well as to maintain the use life of the equipment and in order to consider local conditions it may be of advantage to provide start/stop keys in connection with the display, to provide a key, a menu jump or skip key, the clock and/or stop watch as well as optical and/or acoustical indicators; and the completion key in the immediate vicinity of the actual facilities used for food preparation. On the other hand the storage programming device can be placed elsewhere where it is more convenient to be connected with the aforementioned panel suitable data transmission cable.

DESCRIPTION OF THE DRAWINGS

While the specification concludes with claims particularly pointing out and distinctly claiming the subject matter which is prepared as the invention, it is believed that the invention, the objects and features of the invention and further objects, features and advantages thereof will be better understood from the following description taken in connection with the accompanying drawings in which:

Proceeding now to the detailed description of the drawings FIG. 1 illustrates a case or housing 1 being arranged inside or at least in the immediate vicinity of a kitchen or other food preparation center and being protected, at least as far as its interior is concerned, to the largest possible degree against the moisture, hot temperatures, steam, hot liquids or the like. The arrangement can be constructed to be hung on the wall or in a stand alone version. A circuit shown in block diagram detail in FIG. 2 is maintained inside the housing 1. The circuit 2 includes an input/output module 3 being connected to a clock (not shown) as well as a microprocessor 4, working storage facility 5 (RAM) and a meal program and data store 6. All these components are interconnected by means of a data bus 7 and the microprocessor 4, though its own program will handle the data transfer on that bus, to and from the several components. All of these parts are mounted on a board 8 so that in total, a very small component element is the result, which can be accomodated in a correspondingly small casing.

Figure 1:
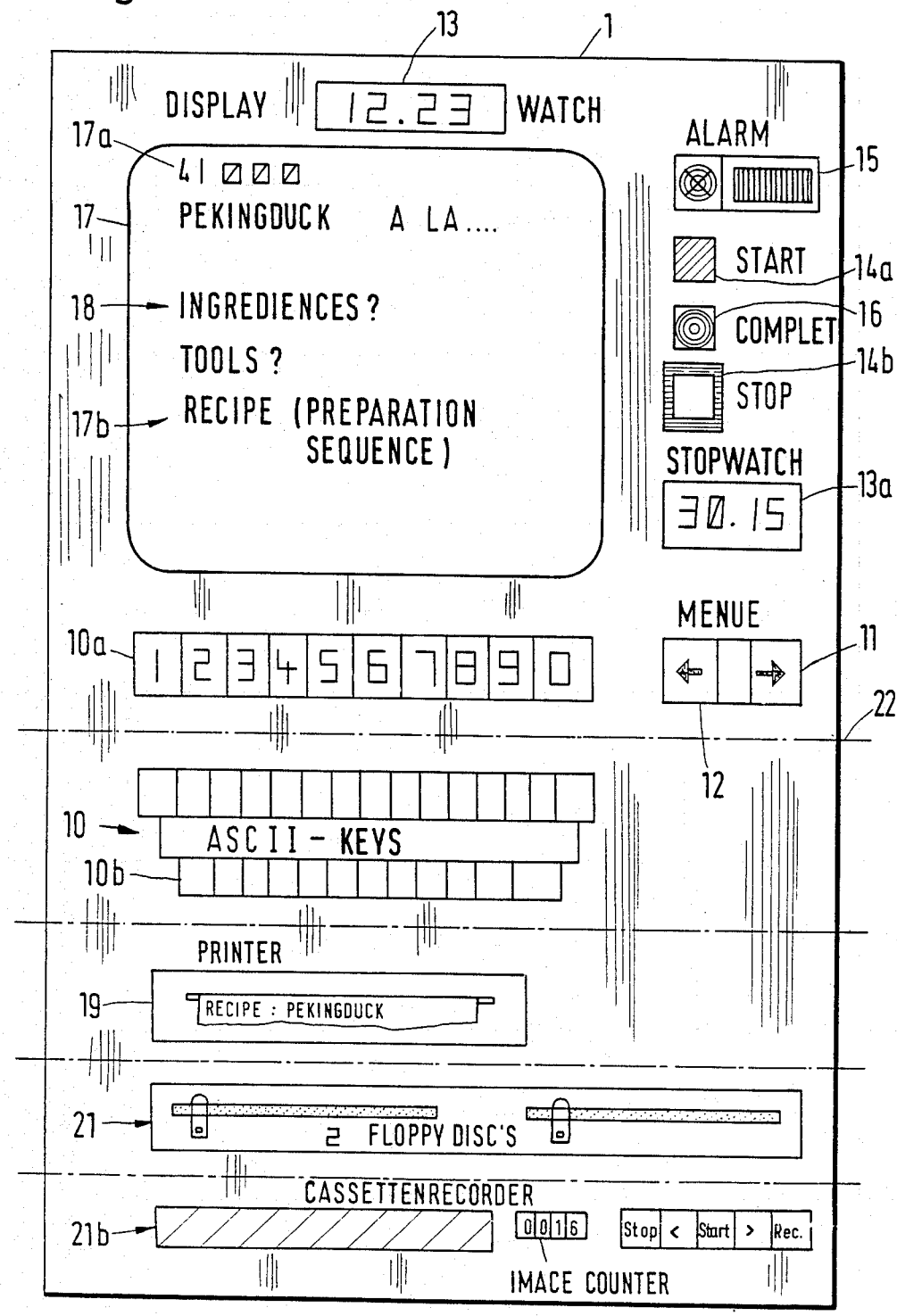
FIG. 1 is a front view of a device constructed in accordance with the preferred embodiment of the present invention.
Figure 2:
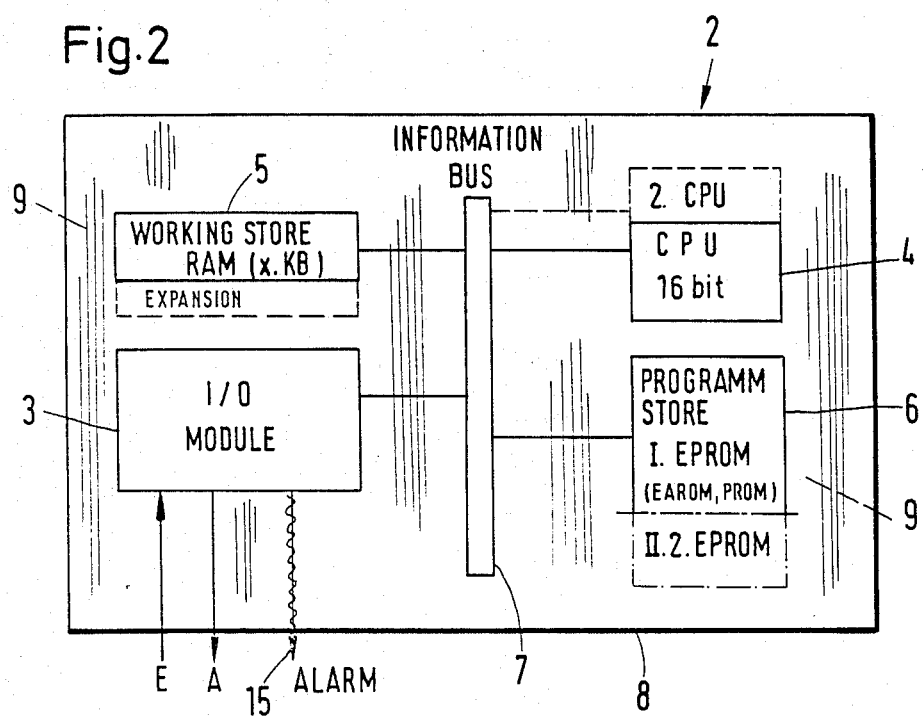
FIG. 2 illustrates the board and the components mounted thereon in order to realize the invention by means of electronic equipment.

The working storage facility 5 and the program and data store 6 together constitute the data storage facility 9. The work storage 5 is constructed as a RAM and will receive, either the selected data readout program with including the dish defining data and/or a dish/meal preparation program for individual meals. If interruption does not occur the respective program is executed. The program store 6 on the other hand is constructed as EPROM, holding a particular combination of dishes for meals and/or of meals and/or relevant data concerning meal preparation. They may be ethnically or regionally organized.

The user has access to menu (dish) jump or skip keys 11 and 12 by means of which a particular sequence of meals or dishes can be called up and the user stops through a list thereof, either in forward or backward direction as far as listing is concerned. Reference numeral 13 refers to a general clock which may be constructed as a stop watch 13a whereby in case of stop watch operation a stop key 14 provides for the control of time selection for individual preparation steps. A start key 14c and a stop key 14b is operatively connected to the 1/0 module 3. The stop key 14b is an interrupt key by means of which the execution of a particular dish and/or meal selection program can be interrupted for emergencies or any other situation. An optical and/or acoustical signal indicator 15 may be used or provided for indication of undesired or impermissible operating steps. In case the operator wants to adhere strictly to the meal program and preparation steps as stored he has to operate after each preparation step a particular completion key 16. Then and only then will the program advance.

The keyboard may be constructed as a simple ten digit key board (10a) or as an alphanumerical keyboard 10b, both keyboards may be provided. In case of a regular ten digit keyboard 10a the display device 17 will display a programmed and selected menu 18 and/or a dish, possibly in conjunction with a list of ingredients and instructions for preparing the particular dish and in addition to a system (or other ID) number 17a which facilitates further inputting. The display device 17 is constructed as a liquid crystal device 17b. The ten digit key board 10a as well as the alphanumerical keyboard 10b have an operating field which is covered with a transparent foil for purposes of protection. The requisite meal and food combination may be printed after the user has in addition inputted the term "ingredients" or a corresponding alphanumerical code. A printer 19 operating with the requisite printing program will then print this information as "order".

Alternatively the display device 17 may be constructed as a TV image like monitor 20 and the program store 6 (or 9) may be supplemented by storage device 21 including for example one or several floppy disk systems. In addition to or in lieu of the floppy disk systems one may use a cassette recorder 21b.

In a particular simple form of practicing the invention the elements depicted in FIG. 1 above the dashed-dot line 22 are mounted physically in one housing. The elements below the line 22 are in fact provided for as expansion of the capacity, and capability of the device as well as the area of use, and can be placed and stored some place else.

Figure 3:
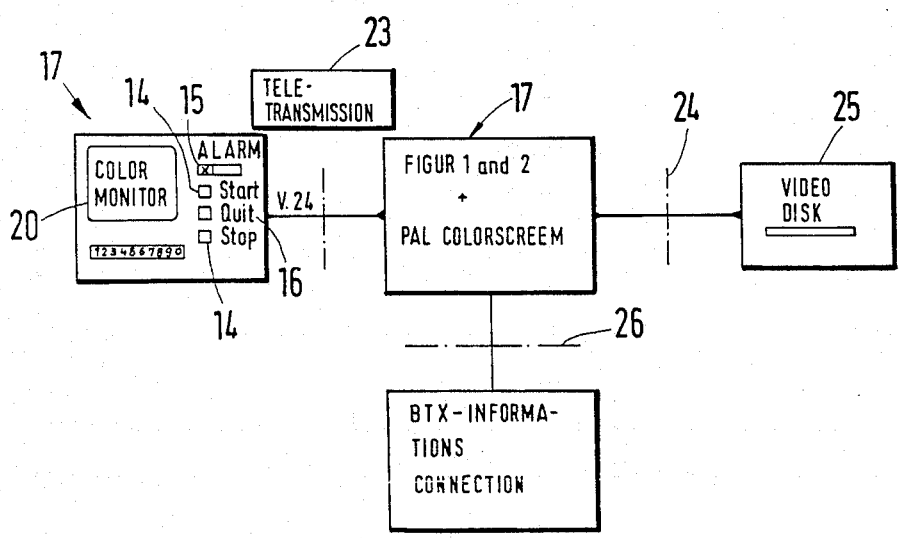
FIG. 3 illustrates a spatial separation of various parts of such an equipment.

FIG. 3 illustrates a new area of application covering both areas just mentioned. In accordance with FIG. 3 the display device 17 includes a TV monitor 20 constructed here as a color TV set and being arranged either in the kitchen itself or in a guest room or a restaurant room. A second indicating device is connected to the first one by means of a data transmission cable 23. Moreover, a connection 24 is provided for a video disk system 25. In additio a BTX connection 26 may be included in the system.

The requisite software for operating this system is included in one or several EPROMS of storage facility 6 and/or the floppy disk system as well as a video disk 25 and/or the cassette recorder. The data are arranged in accordance with certain major groups, for example, appetizer dishes carry a code from 001 to 100; salads carry a code from 101 to 200; soups from 201 to 300; fish dishes from 301 to 400; poultry from 401 to 500; pork dishes from 501 to 600; beef from 601 to 700; vension from 701 to 800; sauces from 801 to 900; deserts from 901 to 1000. Additional items such as cakes may be encoded from 1001 to 1200, exotic fruits from 1201 to 1500, beverages in accordance with the type i.e. alcohol, e.g. beer, wine, champagne, mixed drinks or the like are encoded from 1501 to 2000. Thus one readily sees that not just foods or meals can be stored but additional implements can be encoded separately in a different range such as pots, pans and the like. Also for a selected dish a suitable type of china, silverware and other table implements can be associated to be directly and immediately outputted in conjunction with the respective dishes.

The invention is not limited to the embodiments described above, but allchanges and modifications thereof, not contituting departures from the spirit and scope of the invention, are intended to be included.

I claim:

1. Information device concerning food preparation comprising:
    data storage facilities for storing programs representing a description of ingredients;
    including basic feed stuff and relative quantities as they relate to particular dishes and meals, and (b) description of preparation and combination of a plurality of individual dishes and meals;
    keying means for calling on said information in sequence or at random; and
    display means for displaying said information on call, including particularly associative display of information on ingredients and rules for preparation of one or more particular dishes and meals.

2. Device as in claim 1 and including an input/output module connected to said keying means as well as a microprocessor and a bus interconnecting said input-/output modules and microprocessor and storage facility for menu combining programs, the programs for the preparation of dishes and menus, and identifying data for food items.

* * * * *